United States Patent
Sakata

(10) Patent No.: US 7,809,209 B2
(45) Date of Patent: Oct. 5, 2010

(54) IMAGE DISPLAY DEVICE, AND CONTROL METHOD FOR THE SAME

(75) Inventor: Hidefumi Sakata, Tatsuno-cho (JP)

(73) Assignee: Seiko Epson Corporation, Tokyo (JP)

( * ) Notice: Subject to any disclaimer, the term of this patent is extended or adjusted under 35 U.S.C. 154(b) by 766 days.

(21) Appl. No.: 11/424,186

(22) Filed: Jun. 14, 2006

(65) Prior Publication Data

US 2007/0002081 A1    Jan. 4, 2007

(30) Foreign Application Priority Data

Jun. 15, 2005    (JP) .............................. 2005-174884

(51) Int. Cl.
G06K 9/40    (2006.01)
(52) U.S. Cl. ...................... 382/274; 382/236
(58) Field of Classification Search .............. 345/690; 382/107, 274
See application file for complete search history.

(56) References Cited

U.S. PATENT DOCUMENTS 7,313,280 B2    12/2007    Murai et al.

2005/0001935 A1    1/2005    Kuichi et al.
2006/0119740 A1*    6/2006    Nishi ......................... 348/663

FOREIGN PATENT DOCUMENTS

| JP | A-04-117089 | | 4/1992 |
|---|---|---|---|
| JP | 06311392 | * | 4/1994 |
| JP | A 06-311392 | | 11/1994 |
| JP | A 7-162790 | | 6/1995 |
| JP | A 2002-214700 | | 7/2002 |
| JP | A 2004-282377 | | 10/2004 |
| JP | A 2005-39786 | | 2/2005 |

* cited by examiner

Primary Examiner—Wes Tucker
Assistant Examiner—Mark Roz
(74) Attorney, Agent, or Firm—Oliff & Berridge, PLC

(57) ABSTRACT

An image display device includes: a display unit that displays an image; a scene change detection unit that detects a change observed in a scene of the image; a brightness enhancement determination unit that determines a brightness enhancement level of the image based on a detection result of the scene change detection unit; and a brightness enhancement unit that subjects an image signal of the image to a brightness enhancement process in which, based on a determination result of the brightness enhancement determination unit, a brightness enhancement amount is set to 0 or a small value on a side largely observed with the change of the scene, and on a side scarcely observed with the change of the scene, the brightness enhancement amount is set to a large value.

7 Claims, 3 Drawing Sheets

IMAGE DISPLAY DEVICE, AND CONTROL METHOD FOR THE SAME

BACKGROUND

1. Technical Field

The present invention relates to an image display device, and a control method therefor.

2. Related Art

A previously-known image display device such as projector carries therein a plurality of photo sensors on a rear projector screen. For use in such an image display device, proposed is a method of automatically enhancing the brightness and color balance of video light uniformly in the screen based on detection signals of the photo sensors. As an example, refer to Patent Document 1 (JP-A-7-162790). For the aim of minimizing the reduction in enhancement precision resulting from variations among a plurality of sensors, there is another method of using a single sensor to detect light collected by a plurality of light-gathering units provided as alternatives to sensors, and performing enhancement based on the resulting detection signal. As an example, refer to Patent Document 2 (JP-A-2002-214700).

Even with the methods of Patent Documents 1 and 2, however, it remains generally quite difficult to enhance brightness based on the side of increasing the brightness, and there is thus no choice but to use any portion of the lowest brightness as a basis for the entire brightness enhancement. This consequently causes a problem of reducing the brightness of the entire image as a result of brightness enhancement. This is also true for color enhancement, and due to the necessity for using the lower-chroma side as a basis for color enhancement, i.e., the color of most whitish as a basis, the color reproduction area is thus narrowed.

SUMMARY

An advantage of some aspects of the invention is to provide an image display device that is capable of brightness and color enhancement without viewers being aware of reductions in brightness or color reproducibility of an entire Image, and a control method for such a device.

When the scene of an image shows a large change such as sports scenes, viewers are hardly aware of brightness or color variations in a screen even if there are any. On the other hand, when the scene of an image does not show a change that much such as landscape scenes, the viewers easily aware of brightness or color variations even if they are minute. Inventors of the invention have focused attention on such characteristics of human eyes, and have come up with the configuration of the invention that no or some sort of enhancement is performed when the scene of an image largely changes, and when the scene of an image does not change that much, the enhancement is required to be fully performed.

A first aspect of the invention is directed to an image display device that includes: a display unit that display an image; a scene change detection unit that detects the change observed in a scene of the image; a brightness enhancement determination unit that determines a brightness enhancement level of the image based on the detection result of the scene change detection unit; and a brightness enhancement unit that subjects an image signal of the image to a brightness enhancement process in which, based on the determination result of the brightness enhancement determination unit, a brightness enhancement amount is set to 0 or a small value on a side largely observed with the change of the scene, and on a side scarcely observed with the change of the scene, the brightness enhancement amount is set to a large value.

The reduction of brightness is inevitable at the time of brightness enhancement. With the image display device of the first aspect, however, the brightness can be increased on the side of the scene showing a large change so that the reduction of brightness can be minimized in an entire image. This is thanks to the scene change detection unit detecting the change of the scene, and to the side of the scene showing a large change, the brightness enhancement amount is set to 0 or a small value. To the side of the scene showing a small change, on the other hand, the brightness enhancement amount is set to a large value to fully perform the brightness enhancement so that the resulting image becomes good in condition. What is more, according to the first aspect of the invention, thanks to such effects that the brightness can be increased on the side of the scene showing a large change, if the brightness can remain the same no matter if with scene changes, the light-emitting amount of a light source can be minimized on the side of the scene showing a large change so that the power consumption can be reduced.

A second aspect of the invention is directed to an image display device that includes: a display unit that displays an image; a scene change detection unit that detects whether the image is a scene of a still image or a scene of a moving image; a brightness enhancement determination unit that determines whether or not to apply a brightness enhancement process to the image based on the detection result of the scene change detection unit; and a brightness enhancement unit that applies, based on the determination result of the brightness enhancement determination unit, the brightness enhancement process to an image signal of the image when the image is determined as being a still image, and when the image is determined as being a moving image, does not apply the brightness enhancement process to the image signal.

Also with the image display device of the second aspect, when the scene change detection unit detects any change of a scene, and when the scene is determined as being a moving image, no brightness enhancement is performed so that the reduction of brightness can be minimized in an entire image. On the other hand, when the scene is determined as being a still image, the brightness enhancement is accordingly performed so that the resulting image can be good in condition.

A third aspect of the invention is directed to an image display device that includes: a display unit that displays an image; a scene change detection unit that detects a size of a change observed in a scene when the image is a moving image; a brightness enhancement determination unit that determines a brightness enhancement level of the image based on the detection result of the scene change detection unit; and a brightness enhancement unit that subjects an image signal of the image to a brightness enhancement process in which, based on the determination result of the brightness enhancement determination unit, a brightness enhancement amount is set to a large value when the change observed in the scene is determined as being small, and when the change observed in the scene is determined as being large, the brightness enhancement amount is set to a small value.

Also with the image display device of the third aspect, when the scene change detection unit detects any change of a scene, and when the scene is determined as being a moving image, the brightness enhancement amount is changed depending on the size of the change of the scene, i.e., when the change of the scene is large, the brightness enhancement amount is reduced, so that the brightness reduction is minimized in the entire image. On the other hand, when the change of the scene is small, the brightness enhancement amount is increased so that the resulting image can be good in condition.

The brightness enhancement is described as such, and the color enhancement is exactly the same as will be described below. A fourth aspect of the invention is directed to an image display device that includes: a display unit that displays an image; a scene change detection unit that detects a change observed in a scene of the image; a color enhancement determination unit that determines a color enhancement level of the image based on the detection result of the scene change detection unit; and a color enhancement unit that subjects an image signal of the image to a color enhancement process in which, based on the determination result of the color enhancement determination unit, a color enhancement amount is set to a small value on a side largely observed with the change of the scene, and on a side scarcely observed with the change of the scene, the color enhancement amount is set to a large value.

The entire reduction of chroma is inevitable at the time of color enhancement. With the image display device of the fourth aspect, however, the chroma can be increased on the side of the scene showing a large change so that the color reproduction area can remain wide. This is thanks to the scene change detection unit detecting the change of the scene, and to the side of the scene showing a large change, the color enhancement amount is set to 0 or a small value. To the side of the scene showing a small change, on the other hand, the color enhancement amount is set to a large value to fully perform the color enhancement so that the resulting image can be high in color reproducibility.

A fifth aspect of the Invention is directed to an image display device that includes: a display unit that displays an image; a scene change detection unit that detects whether the image is a scene of a still image or a scene of a moving image; a color enhancement determination unit that determines whether or not to apply a color enhancement process to the image based on the detection result of the scene change detection unit; and a color enhancement unit that applies, based on the determination result of the color enhancement determination unit, the color enhancement process to an image signal of the image when the image is determined as being a still image, and when the image is determined as being a moving image, does not apply the color enhancement process to the image signal.

Also with the image display device of the fifth aspect, when the scene change detection unit detects any change of a scene, and when the scene is determined as being a moving image, no color enhancement is performed so that the reduction of chroma can be minimized in an entire image. On the other hand, when the scene is determined as being a still image, the color enhancement is accordingly performed so that the resulting image can be high in reproducibility.

A sixth aspect of the invention is directed to an image display device that includes: a display unit that displays an image; a scene change detection unit that detects a size of a change observed in a scene when the image is a moving image; a color enhancement determination unit that determines a color enhancement level of the image based on the detection result of the scene change detection unit; and a color enhancement unit that subjects an image signal of the image to a color enhancement process in which, based on the determination result of the color enhancement determination unit, a color enhancement amount is set to a large value when the change observed in the scene is determined as being small, and when the change observed in the scene is determined as being large, the color enhancement amount is set to a small value.

Also with the image display device of the sixth aspect, when the scene change detection unit detects any change of a scene, and when the scene is determined as being a moving image, the color enhancement amount is changed depending on the size of change of the scene, i.e., when the change of the scene is large, the color enhancement amount is reduced, so that the chroma reduction is minimized in the entire image. On the other hand, when the change of the scene is small, the color enhancement amount is increased so that the resulting image can be high in reproducibility.

Any of the image display devices of the first to sixth aspects may have the configuration in which a screen for display of the image is divided into a plurality of regions, and for each of the resulting regions, the scene change detection unit detects the change observed in the scene.

With such a configuration, even with a screen carrying therein both still image portions and moving image portions, for example, the entire screen can be efficiently prevented from being lowered in brightness or chroma so that the resulting image can be high in display quality.

A seventh aspect of the invention is directed to a control method of an image display device, in which when an image is displayed, a brightness enhancement process is applied to an image signal of the image by detecting a change observed in a scene of the image, and based on the detection result, by setting a brightness enhancement amount to a small value on a side largely observed with the change of the scene, and by setting the brightness enhancement amount to a large value on a side scarcely observed with the change of the scene.

An eighth aspect of the invention is directed to a control method of an image display device, in which when an image is displayed, a color enhancement process is applied to an image signal of the image by detecting a change observed in a scene of the image, and based on the detection result, by setting a color enhancement amount to a small value on a side largely observed with the change of the scene, and by setting the color enhancement amount to a large value on a side scarcely observed with the change of the scene.

The effects and advantages achieved by the control methods of the eighth and ninth aspects are similar to the above.

BRIEF DESCRIPTION OF THE DRAWINGS

The invention will be described with reference to the accompanying drawings, wherein like numbers reference like elements.

DESCRIPTION OF EXEMPLARY EMBODIMENT

In the below, an embodiment of the invention is described by referring to FIGS. 1 to 3.

An image display device of the embodiment is exemplified by a projector carrying therein a liquid crystal light valve as a display unit.

Figure 1:
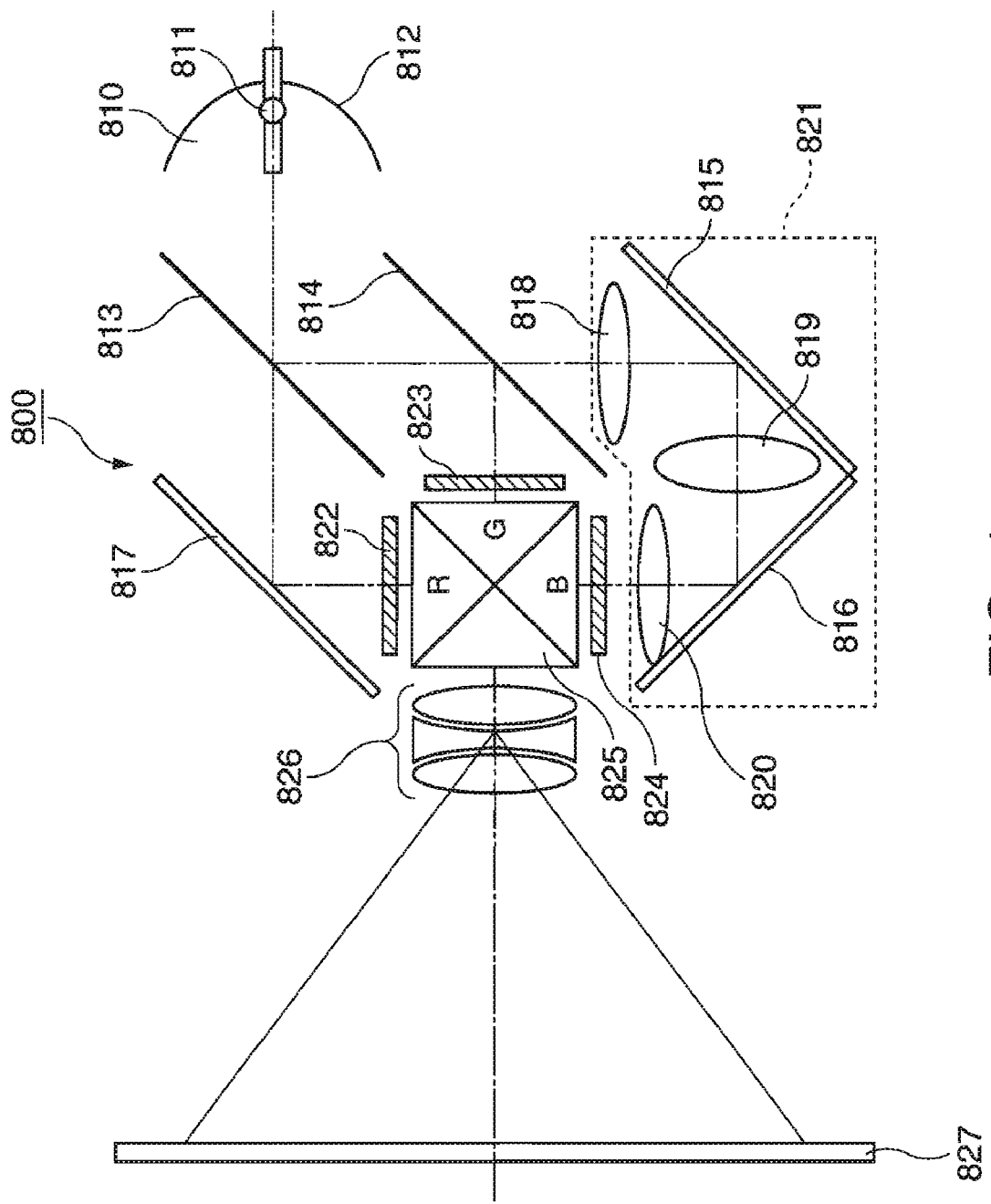
FIG. 1 is a schematic diagram showing the configuration of a projector in an embodiment of the invention.

FIG. 1 is a schematic configuration diagram showing the main components of the projector in the embodiment of the invention. FIG. 2 is a block diagram showing the configuration of a drive circuit section of the projector, and FIG. 3 is a flowchart for illustrating the operation of a brightness enhancement determination circuit, which will be described later. Note that, in the drawings for reference use below, the components are not drawn to scale if necessary to show the components in appropriate size for perception.

As shown in FIG. 1, a projector 800 (image display device) of the embodiment is configured to include: a light source 810; dichroic mirrors 813 and 314; reflection mirrors 815, 816, and 817; a light-entering lens 818; a relay lens 819; a light-exiting lens 820; a liquid crystal light valves 822, 823, and 824; a cross dichroic prism 825, and a projection lens 820. The light source 810 is configured by a lamp 811 exemplified by a high-pressure mercury lamp or a metal halide lamp; and a reflector 812 that reflects the light of the lamp.

The dichroic mirror 813 has a function of passing through red light included in white light coming from the light source 810, and reflecting blue and green lights. The dichroic mirror 814 has a function of passing through the blue light but reflecting the green light. Accordingly, the red light passing through the dichroic mirror 813 is reflected by the reflection mirror 817, and enters into the liquid crystal light valve 822 provided specifically for the red light. The green light reflected by the dichroic mirror 813 is reflected by the dichroic mirror 814, and enters into the liquid crystal light valve 823 provided specifically for the green light.

The blue light reflected by the dichroic mirror 813 passes through the dichroic mirror 814. For the aim of precluding any light loss due to a long optical path, a light guidance unit 821 is provided for the blue light. The light guidance unit 821 is of a relay lens system, including the relay lens 819, and the light-exiting lens 820. Via such a light guidance unit 821, the blue light is guided into the liquid crystal light valve 824 provided specifically for the blue light.

After modulation by each corresponding liquid crystal light valve, the three color lights enter into the cross dichroic prism 825. This cross dichroic prism 825 is made of four right-angle prisms attached together. The interfaces of the right-angle prisms are formed in the shape of X with a dielectric multilayer film that reflects the red light, and another that reflects the blue light. By such dielectric multilayer films, the three color lights are combined together so that the light of a color image is formed. By the projection lens 826 serving as a projection optical system, the resulting combined light is projected on a screen 827, and an enlarged image is displayed thereon.

Figure 2:
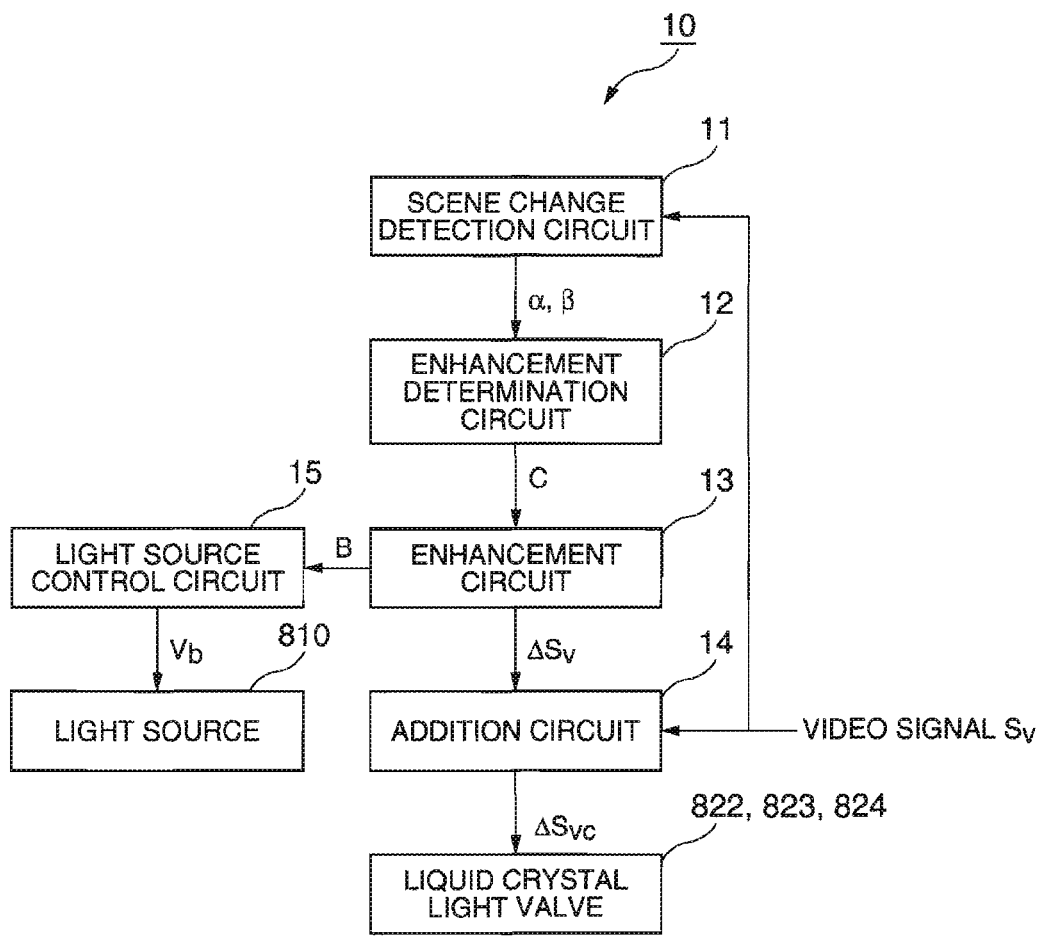
FIG. 2 is a block diagram showing a drive circuit section of the projector of FIG. 1.
Figure 3:
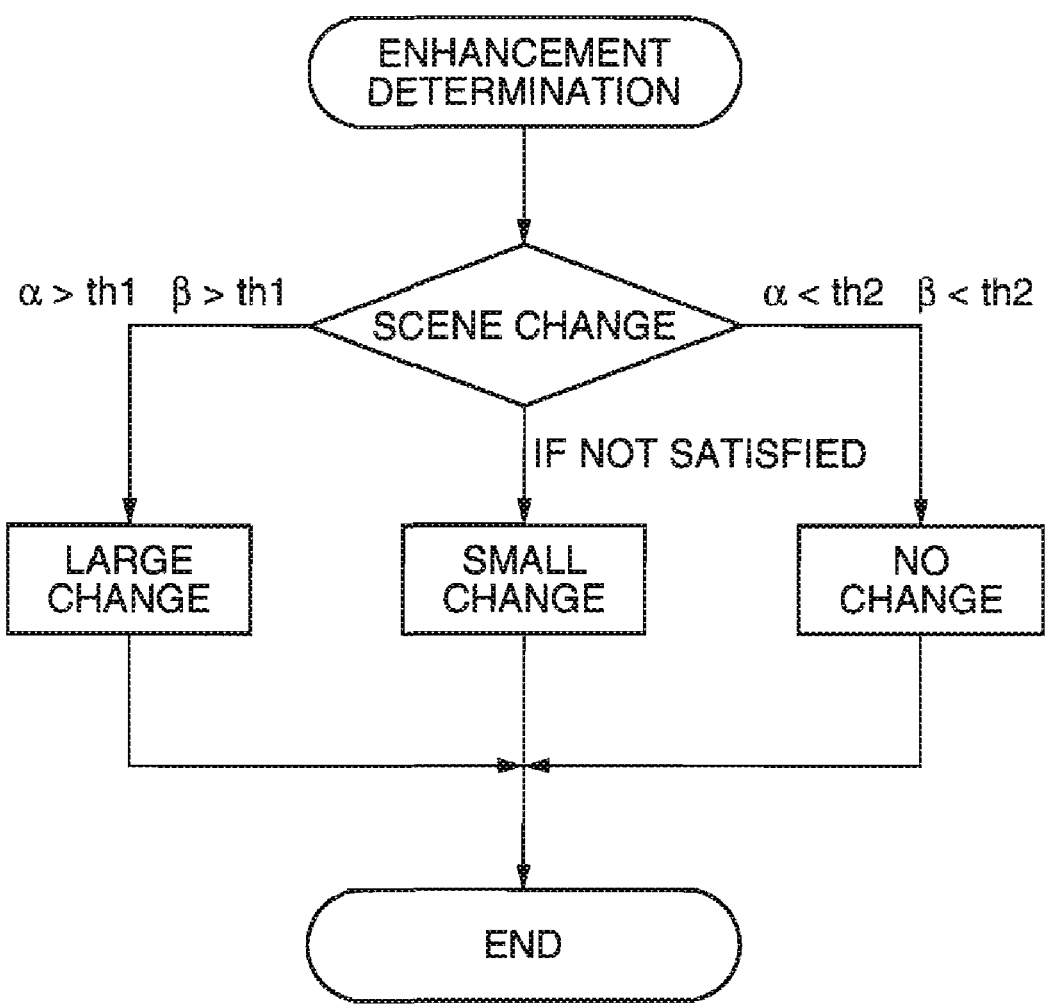
FIG. 3 is a flowchart for illustrating the operation of an enhancement determination circuit of the drive circuit section of FIG. 2.

FIG. 2 is a block diagram showing the configuration of a drive circuit section 10 of the projector configured as above. Exemplified in this embodiment is a case where only bright enhancement (bright correction) is performed. As shown in FIG. 2, in the projector 800 of the embodiment, the drive circuit section 10 is configured by: a scene change detection circuit 11 (scene change detection unit); an enhancement determination circuit 12 (brightness enhancement determination unit); an enhancement circuit 13 (brightness enhancement unit); an addition circuit 14; and a light source control circuit 15.

A video signal Sv coming from the outside is forwarded to both the scene change detection circuit 11 and the addition circuit 14.

The scene change detection circuit 11 first calculates a parameter for use as a factor to determine the size of a change of a video scene, i.e., whether the current scene is a still image or a moving image, and if the scene is a moving image, whether the change observed in the scene is large or small. Described in this embodiment is an exemplary method of detecting the change of a scene with attention on the shape change of a brightness histogram between frames.

Using the following equation 1, a normalized brightness histogram Hi is calculated.

Equation 1

$H_i = h_i / \max(h_i)$, where hi denotes a brightness histogram, max(hi) denotes the maximum frequency value in the brightness histogram, and i denotes the frame number. Accordingly, the equation 1 is the result of normalizing the maximum value of the brightness histogram to be 1, and the resulting normalized brightness histogram is represented as Hi.

Using such resulting Hi and the following equations 2 and 3, scene change determination parameters α and β are calculated.

Equation 2

$$\alpha = \sum_{j=0}^{n} |H_{i-1}^2(j) - H_i(j)H_{i-1}(j)|,$$

where j denotes a class index of the brightness histogram. Accordingly, for any two consecutive frames, a differential value is calculated between the square of a frequency value of the first frame, and the product of a frequency value of the first frame and that of a frame subsequent to the first frame. The parameter α is representing a total sum of thus calculated differential values for the entire classes.

Equation 3

$$\beta = \sum_{j=0}^{n} |H_i^2(j) - H_i(j)H_{i-1}(j)|,$$

where β derived by the equation 3 is representing, similarly to the equation 2, a total sum of differential values calculated for the entire classes, i.e., a differential value is the one calculated between the square of a frequency value of the second frame, and the product of a frequency value of a frame preceding to the second frame and that of the second frame.

The parameters α and β calculated by the scene change detection circuit 11 are forwarded to the enhancement determination circuit 12. As shown in FIG. 3, in the enhancement determination circuit 12, a determination is made whether video scenes are still images or moving images, or a determination is made about the size of the change observed in the scenes. For such determinations, a comparison is made between threshold values th1 and th2, which are stored separately from the parameters α and β. More in detail, because the threshold values th1 and th2 have such a size relationship as th1>th2, the threshold value th1 is first subjected to a comparison with the parameters α and β, and then the threshold value th2 follows. Although the number of threshold values for comparison may be one, using such two threshold values th1 and th2 for determination of the parameters α and β will increase the detection precision.

When the comparison result tells that the relationships of α<th2 and β<th2 are both satisfied, the scene is determined that no change is observed therein, i.e., the scene is a still image. If not, the scene is determined that some change is observed therein, i.e., the scene is a moving image. When the relationships of α>th1 and β>th1 are both satisfied, the scene is determined as showing relatively a large change as being a moving image. When any other relationships are satisfied, the scene is determined as showing relatively a small change. That is, in the enhancement determination circuit 12, a determination is made to which pattern the current scene belongs, i.e., three patterns of the current scene being a still image (no scene change is observed), a moving image with a small scene change, and a moving image with a large scene change. The determination boundaries for these three patterns, i.e., the boundary level for a moving or still image, or the boundary level for a small or large scene change, can be adjusted by a value setting made to the threshold values th1 and th2 as appropriate.

The determination result C of the enhancement determination circuit 12, i.e., scene change: 0, small, or large, is forwarded to the enhancement circuit 13. The enhancement circuit 13 is previously provided with a lookup table (LUT) in which any of the three determination results is correlated to a video signal enhancement value. Based on the LUT, a video signal enhancement value ΔSv correlated to the determination result is determined. More specifically, when the scene change is 0, the correlated enhancement value is relatively large. When the scene change is small, the correlated enhancement value is relatively small, and when the scene change is large, the correlated enhancement value is 0. Although details will be described later, the enhancement circuit 13 is provided with another lookup table (LUT) in which any of the three determination results is correlated to a light source brightness value. Based on this LUT, a light source brightness value B correlated to the determination result is determined.

The video signal enhancement value ΔSv determined by the enhancement circuit 13 is forwarded to the addition circuit 14. The addition circuit 14 is also provided with an original video signal Sv. The original video signal Sv and the video signal enhancement value ΔSv are added together, and the result is an enhanced video signal Svc. The enhanced video signal Svc is forwarded to the liquid crystal light valves 822, 823, and 824 (display units). In the liquid crystal light valves 822, 823, and 824, incoming light is modulated based on the enhanced video signal Svc.

The light source brightness value B determined by the enhancement circuit 13 is then forwarded to the light source control circuit 15. In the light source control circuit 15, the light source brightness value B is converted into a physical quantity such as drive voltage Vb for actual driving of the light source 810. This drive voltage Vb is supplied to the light source 810 so that the light source 810 is driven.

In the projector 800 of this embodiment, such a series of sequences is automatically executed at given intervals, and the brightness enhancement is automatically performed in accordance with the size of scene change. Herein, the series of sequences include detection of scene change, determination of enhancement, determination of enhancement value, enhancement of video signal, and control over light source.

The reduction of brightness is generally inevitable at the time of brightness enhancement. With the projector 800 of the embodiment, however, the brightness can be increased when the scene change is large so that the reduction of brightness can be minimized in an entire image. This is thanks to the configuration in which the scene change detection circuit 11 detects any change of the scene, and the enhancement determination circuit 12 makes a determination thereabout, i.e., when the scene change is determined as being large, the video signal enhancement value ΔSv is set to 0. When the scene is observed with no change (being a still image), on the other hand, the video signal enhancement value ΔSv is set large so that the brightness enhancement is fully performed, thereby leading to the video high in display quality. What is more, thanks to such effects that the brightness can be increased on the side of the scene showing a large change, if the brightness can remain the same no matter if with scene changes, the power consumption can be reduced on the side of the scene showing a large change. When the scene change is small, the operation level is intermediate of the above two cases so that the resulting projector can be highly effective.

The technical scope of the invention is surely not restrictive to the above embodiment, and it is understood that numerous other modifications and variations can be devised without departing from the scope of the invention. In the above embodiment, exemplified is the scene change detection method of detecting the frame-to-frame shape change of a brightness histogram. This is not the only option, and any well-known method can be adopted, e.g., a method of detecting any change of a brightness average value, or a method of detecting any change of a brightness minimum or maximum value.

Although exemplified in the embodiment is the brightness enhancement, color enhancement (color correction) can be performed in exactly the same manner, or both brightness and color enhancement may be performed. With color enhancement, similarly to the above, the scene detection is performed, and thus detected scene change is assigned to any one of three patterns, i.e., scene change of 0, small, and large. On the side of the scene showing a large change, the color enhancement value is set to 0 or a small value. This enables to increase the chroma on the side of the scene showing a large change so that the color reproduction area can remain wide. To the side of the scene showing a small change, on the other hand, the color enhancement amount is set to a large value to fully perform the color enhancement so that the resulting image can be high in color reproducibility.

Exemplified above is the case of classifying the size of scene change into three of 0, small, and large. As an alternative manner, when the relationships of α<th2 and β<th2 are both satisfied, the scene may be determined as being a still image, and if not satisfied, the scene may be determined as being a moving image. For a still image, any predetermined video signal enhancement value may be used for enhancement, and for a moving image, no enhancement may be performed. With this being the case, the procedure is simplified so that the drive circuit section can be reduced in size compared with the embodiment.

As an alternative configuration, an image display screen may be divided into a plurality of regions, and in each of the resulting regions, a scene change detection circuit may detect any scene change. With this being the configuration, for example, even if a screen carrying therein both still image portions and moving image portions, for example, the entire screen can be efficiently prevented from being lowered in brightness or chroma so that the resulting image can be high in display quality.

The image display device is exemplified by a projector in the embodiment. This is surely not the only possibility, and the invention is applicable to liquid crystal displays (LCD: Liquid Crystal Display), EL (Electro-luminescence) display, plasma display, CRT (Cathode Ray Tube), and the like.

The entire disclosure of Japanese Patent Application No. 2005-174884, filed Jun. 15, 2005 is expressly incorporated by reference herein.

What is claimed is:

1. An image display device, comprising;
   a display unit that displays an image;
   a scene change detection unit that detects a change observed in a scene of the image and calculates at least one parameter based on the change observed, the at least one parameter including:

a first parameter determined by a difference of: a square of a frequency value of a first frame, and a product of a frequency value of a frame subsequent to the first frame and the frequency value of the first frame, and a second parameter determined by a difference of: a square of a frequency value of a second frame, and a product of a frequency value of a frame preceding the second frame and the frequency value of the second frame;

a scene change determination unit that determines a scene change level of the image based on a comparison between the at least one parameter calculated by the scene change detection unit and more than one threshold value, the more than one threshold value including; a first threshold value, and a second threshold value, the first threshold being greater than the second threshold, the scene change level determined to be zero in a case where both the first parameter and the second parameter are less than the second threshold, the scene change level determined to be large with respect to a boundary level in a case where both the first parameter and the second parameter are greater than the first threshold, and the scene change level determined to be small with respect to the boundary level in all other cases; and a brightness enhancement unit that subjects an image signal of the image to a brightness enhancement process in which, based on a determination result of the scene change determination unit, a brightness enhancement amount is set to 0 in a case where the scene change level is large, set to a first value in a case where the scene change level is zero, and set to a second value which is smaller than the first value in a case where the scene change level is small.

2. The image display device according to claim 1, wherein
the scene change detection unit detects, as a detection result, whether the image is a scene of a still image or a scene of a moving image;
the scene change determination unit determines whether or not to apply a brightness enhancement process to the image based on the detection result of the scene change detection unit; and
the brightness enhancement unit applies, based on a determination result of the scene change determination unit, the brightness enhancement process to an image signal of the image when the image is determined as being a still image, and when the image is determined as being a moving image, does not apply the brightness enhancement process to the image signal.

3. An image display device, comprising:
a display unit that displays an image;
a scene change detection unit that detects a change observed in a scene of the image and calculates at least one parameter based on the change observed, the at least one parameter including:
a first parameter determined by a difference of: a square of a frequency value of a first frame, and a product of a frequency value of a frame subsequent to the first frame and the frequency value of the first frame, and
a second parameter determined by a difference of: a square of a frequency value of a second frame, and a product of a frequency value of a frame preceding the second frame and the frequency value of the second frame;
a scene change determination unit that determines a scene change level of the image based on a comparison between the at least one parameter calculated by the scene change detection unit and more than one threshold value, the more than one threshold value including; a first threshold value, and a second threshold value, the first threshold being greater than the second threshold, the scene change level determined to be zero in a case where both the first parameter and the second parameter are less than the second threshold, the scene change level determined to be large with respect to a boundary level in a case where both the first parameter and the second parameter are greater than the first threshold, and the scene change level determined to be small with respect to the boundary level in all other cases; and a color enhancement unit that subjects an image signal of the image to a color enhancement process in which, based on a determination result of the scene change determination unit, a color enhancement amount is set to 0 in a case where the scene change level is large, set to a first value in a case where the scene change level is zero, and set to a second value which is smaller than the first value in a case where the scene change level is small.

4. The image display device according to claim 3, wherein
the scene change detection unit detects, as a detection result, whether the image is a scene of a still image or a scene of a moving image;
the scene change determination unit determines whether or not to apply a color enhancement process to the image based on the detection result of the scene change detection unit; and
the color enhancement unit applies, based on a determination result of the scene change determination unit, the color enhancement process to an image signal of the image when the image is determined as being a still image, and when the image is determined as being a moving image, does not apply the color enhancement process to the image signal.

5. The image display device according to claim 1, wherein
a screen for display of the image is divided into a plurality of regions, and for each of resulting regions, the scene change detection unit detects the change observed in the scene.

6. A control method of an image display device comprising;
displaying an image;
applying an enhancement process to detect a change observed in a scene of the image and calculating at least one parameter based on the change observed, the calculating the at least one parameter including:
calculating a first parameter as a difference of: a square of a frequency value of a first frame, and a product of a frequency value of a frame subsequent the first frame and the frequency value of the first frame, and
calculating a second parameter as a difference of: a square of a frequency value of a second frame, and a product of a frequency value of a frame preceding the second frame and the frequency value of the second frame;
determining scene change level based on a comparison between the at least one parameter calculated by the scene change detection unit and more than one threshold value, the more than one threshold value including: a first threshold value, and a second threshold value, the first threshold being greater than the second threshold, the scene change level determined to be zero in a case where both the first parameter and the second parameter are less than the second threshold, the scene change level determined to be large with respect to a boundary level in a case where both the first parameter and the second parameter are greater than the first threshold, and the scene change level determined to be small with respect to the boundary level in all other cases; and setting, based on the determined scene change level, a enhancement amount to 0 in a case where the scene change level is large, to a first value in a case where the scene change level is zero, and to a second value which is smaller than the first value in a case where the scene change level is small.

7. The control method of a image display device according to claim 6, the enhancement process being at least one of a brightness enhancement process and a color enhancement process, the enhancement amount being at least one of a enhancement brightness amount and a enhancement color amount.

* * * * *